United States Patent
Murase

(10) Patent No.: US 10,929,566 B2
(45) Date of Patent: Feb. 23, 2021

(54) INFORMATION PROCESSING DEVICE AND INFORMATION PROCESSING SYSTEM

(71) Applicant: Panasonic Intellectual Property Management Co., Ltd., Osaka (JP)

(72) Inventor: Masamitsu Murase, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 155 days.

(21) Appl. No.: 16/167,872

(22) Filed: Oct. 23, 2018

(65) Prior Publication Data

US 2019/0057220 A1 Feb. 21, 2019

Related U.S. Application Data

(63) Continuation of application No. PCT/JP2017/014329, filed on Apr. 6, 2017.

(30) Foreign Application Priority Data

Jun. 2, 2016 (JP) ................................ JP2016-111198

(51) Int. Cl.
*G06F 21/62* (2013.01)
*H04L 9/08* (2006.01)
(Continued)

(52) U.S. Cl.
CPC .......... *G06F 21/629* (2013.01); *G06F 9/4401* (2013.01); *G06F 12/1408* (2013.01);
(Continued)

(58) Field of Classification Search
CPC .... G06F 21/629; G06F 9/4401; G06F 12/572; G06F 21/575; H04L 9/0877; H04L 9/3247
(Continued)

(56) References Cited

U.S. PATENT DOCUMENTS 6,393,564 B1  5/2002  Kanemitsu et al.
8,516,236 B2*  8/2013  Hamid .................. G06F 9/4411
                                                           713/2
(Continued)

FOREIGN PATENT DOCUMENTS

JP    11-109856     4/1999
JP    2000-250819   9/2000
(Continued)

OTHER PUBLICATIONS

Exploring storage class memory with key value stores Katelin A. Bailey, Peter Hornyack, Luis Ceze, Steven D. Gribble, Henry M. Levy INFLOW '13: Proceedings of the 1st Workshop on Interactions of NVM/FLASH with Operating Systems and Workloads. Nov. 2013, Article No. 4, pp. 1-8 (Year: 2013).*

(Continued)

*Primary Examiner* — Kambiz Zand
*Assistant Examiner* — Mohammad S Shams
(74) *Attorney, Agent, or Firm* — Wenderoth, Lind & Ponack, L.L.P.

(57) ABSTRACT

An information processing device includes: a medium connection unit that reads first key information from a detachable first recording medium; and a second recording medium storing firmware. The firmware is a program to be executed at a time of start-up of the information processing device and contains second key information. The information processing device includes: a third recording medium storing encrypted data; and a control unit that reads the encrypted data from the third recording medium and decrypts the encrypted data. At the time of start-up of the information processing device, the control unit operates in accordance with the firmware to generate a decryption key for decrypting the encrypted data, from the first key information and the second key information.

6 Claims, 4 Drawing Sheets

(51) Int. Cl.
*H04L 9/32* (2006.01)
*G06F 21/57* (2013.01)
*G06F 9/4401* (2018.01)
*G06F 12/14* (2006.01)

(52) U.S. Cl.
CPC .......... *G06F 21/572* (2013.01); *G06F 21/575* (2013.01); *H04L 9/0877* (2013.01); *H04L 9/0897* (2013.01); *H04L 9/3247* (2013.01)

(58) Field of Classification Search
USPC ....................................................... 713/189
See application file for complete search history.

(56) References Cited

U.S. PATENT DOCUMENTS

| | | | | |
|---|---|---|---|---|
| 8,793,765 | B2* | 7/2014 | Volmat | G06F 21/572 380/247 |
| 8,924,699 | B2* | 12/2014 | Muir | G06F 21/572 713/1 |
| 8,972,743 | B2* | 3/2015 | Wang | G06F 21/62 713/183 |
| 9,087,197 | B2* | 7/2015 | Hamid | G06F 21/57 |
| 9,721,100 | B2* | 8/2017 | Grawrock | G06F 21/71 |
| 10,013,563 | B2* | 7/2018 | Rahardjo | G06F 21/602 |
| 2002/0087877 | A1* | 7/2002 | Grawrock | G06F 21/34 726/26 |
| 2006/0161784 | A1* | 7/2006 | Hunter | G06F 21/575 713/182 |
| 2008/0148388 | A1 | 6/2008 | Wooten et al. | |
| 2012/0185685 | A1 | 7/2012 | Volmat et al. | |
| 2012/0254602 | A1* | 10/2012 | Bhansali | G06F 9/4406 713/2 |
| 2013/0336489 | A1* | 12/2013 | Kato | H04L 9/14 380/285 |
| 2014/0089656 | A1 | 3/2014 | Volmat et al. | |
| 2015/0096058 | A1 | 4/2015 | Matsukawa et al. | |

FOREIGN PATENT DOCUMENTS

| | | |
|---|---|---|
| JP | 2004-355268 | 12/2004 |
| JP | 2007-188307 | 7/2007 |
| JP | 2007-189590 | 7/2007 |
| JP | 2008-295008 | 12/2008 |
| JP | 2012-164300 | 8/2012 |
| JP | 2015-69371 | 4/2015 |

OTHER PUBLICATIONS

Mutual authentication scheme with key agreement for industrial wireless network Min Wei, Keecheon Kim, Ping Wang ICUIMC '11: Proceedings of the 5th International Conference on Ubiquitous Information Management and Communication. Feb. 2011, Article No. 23, pp. 1-8 (Year: 2011).*

International Search Report dated Jul. 11, 2017 in International (PCT) Application No. PCT/JP2017/014329.

* cited by examiner

INFORMATION PROCESSING DEVICE AND INFORMATION PROCESSING SYSTEM

TECHNICAL FIELD

The present disclosure relates to an information processing device and an information processing system that decrypt encrypted data by using a decryption key.

BACKGROUND ART

PTL 1 discloses a decryption device that generates a decryption key on the basis of two pieces of decryption key information. Specifically, the decryption device of PTL 1 includes: a decryption key generation circuit that generates a decryption key on the basis of first and second decryption key information; and a decryption circuit that decrypts encrypted information by using the decryption key. The first decryption key information is input from outside the decryption device, and the second decryption key information is stored in the decryption device. As described above, since part of the information (in other words, second decryption key information) to be used to generate the decryption key is stored in the decryption device, unauthorized acquisition of the decryption key information (second decryption key information) by a third person is difficult. This configuration reduces the possibility of unauthorized reading of encrypted data.

CITATION LIST

Patent Literature

PTL 1: Unexamined Japanese Patent Publication No. H11-109856

SUMMARY OF THE INVENTION

In a first aspect of the present disclosure, an information processing device is provided. The information processing device includes: a medium connection unit that reads first key information from a detachable first recording medium; and a second recording medium storing firmware. The firmware is a program to be executed at a time of start-up of the information processing device and contains second key information. The information processing device includes: a third recording medium storing encrypted data; and a control unit that reads the encrypted data from the third recording medium and decrypts the encrypted data.

At a time of start-up of the information processing device, the control unit operates in accordance with the firmware to generate a decryption key for decrypting the encrypted data, from the first key information and the second key information.

In a second aspect of the present disclosure, an information processing system is provided that includes: an information processing device; and a first recording medium that stores first key information and is detachable from the information processing device. The information processing device includes: a medium connection unit that reads the first key information from the first recording medium; and a second recording medium storing firmware. The firmware is a program to be executed at a time of start-up of the information processing device and contains second key information. The information processing device includes: a third recording medium storing encrypted data; and a control unit that reads the encrypted data from the third recording medium and decrypts the encrypted data. At the time of start-up of the information processing device, the control unit operates in accordance with the firmware to generate a decryption key for decrypting the encrypted data, from the first key information and the second key information.

DESCRIPTION OF EMBODIMENTS

Hereinafter, exemplary embodiments will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the present inventor will provide the accompanying drawings and the following description for those skilled in the art to sufficiently understand the present disclosure, and does not intend to limit the subject matter described in the claims.

First Exemplary Embodiment

Hereinafter, an exemplary embodiment of an information processing device according to the present disclosure will be described. The information processing device is, for example, a personal computer and a server device that realize predetermined functions by executing a program.

[1-1. Configuration]

Figure 1:
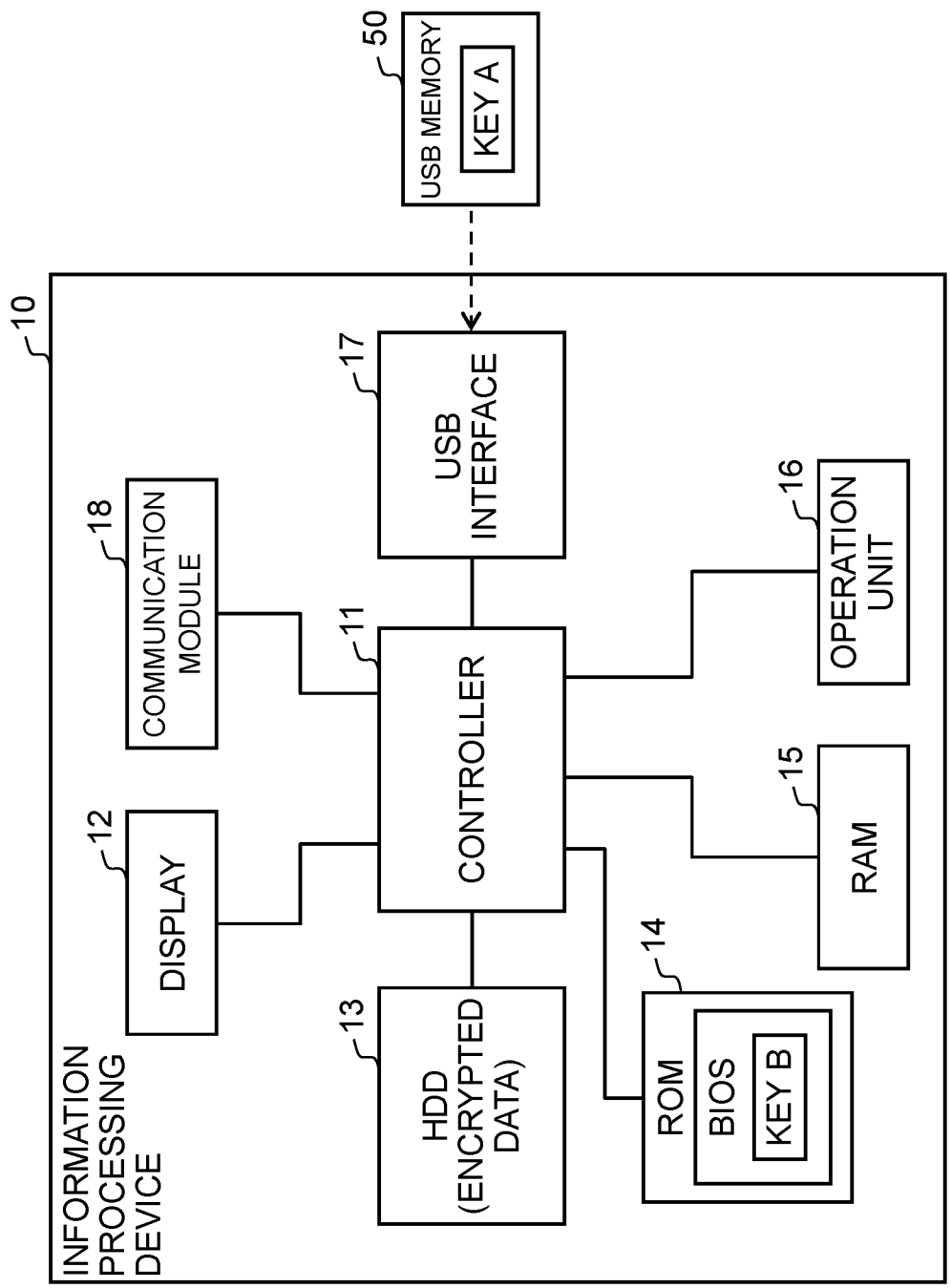
FIG. 1 is a configuration diagram of an information processing device according to a first exemplary embodiment of the present disclosure.

FIG. 1 a diagram showing an electrical configuration of the information processing device. Information processing device 10 includes: controller 11; display 12; hard disk drive (HDD) 13; read only memory (ROM) 14; random access memory (RAM) 15; operation unit 16; universal serial bus (USB) interface unit 17; and communication module 18.

Controller 11 includes a central processing unit (CPU), a micro processing unit (MPU), and other components to realize a function to be described below by executing a program.

HDD 13 is a recording medium storing data. HDD 13 stores an operating system (OS), a driver and a utility for driving various devices, an application program, and data. In HDD 13, encrypted data is recorded.

Operation unit 16 is a member with which a user operates and which includes a keyboard, a touch pad, a touch panel, a button, and the like.

USB interface unit 17 includes a USB connector and an interface circuit for connecting an external device to information processing device 10 by following the standard of USB. Examples of the external device include a USB memory, a mouse, a keyboard, a printer, and an external hard disk. In the present exemplary embodiment, a description is given on a function and an operation of information processing device 10 in a state where USB memory 50 is connected to USB interface unit 17.

Communication module 18 is a module for communicating with other equipment in compliance with the standard of wired LAN such as IEEE802.3 or the standard of wireless LAN such as WiFi or IEEE802.11. Communication module 18 may include a module for connecting to a public communication line by a communication system such as 3G (third generation) or long term evolution (LTE).

ROM 14 is a non-rewritable recording medium storing firmware such as a basic input/output system (BIOS). The BIOS is a program to be first executed at a time of start-up of information processing device 10 (at a time of power-on) and has a function to initialize hardware and to call a bootloader.

RAM 15 temporarily stores information necessary for an operation on controller 11.

Figure 2:
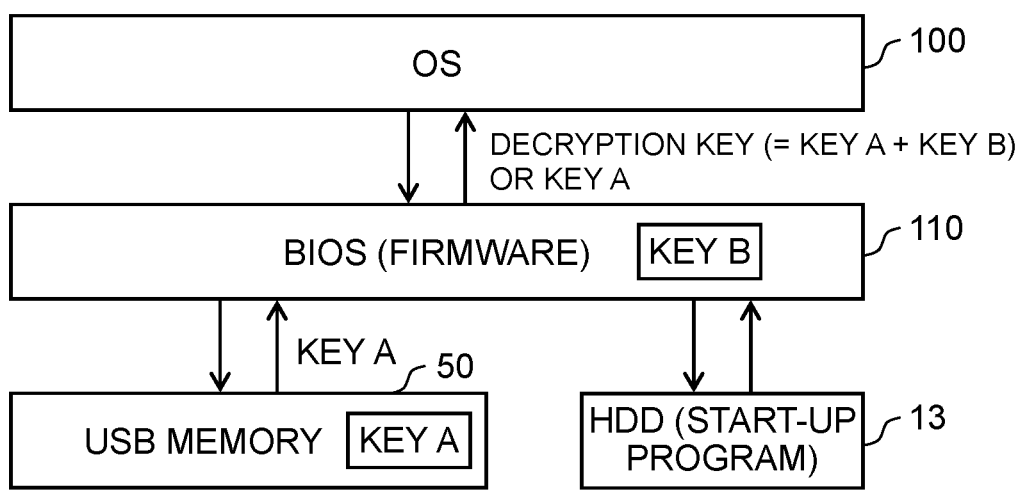
FIG. 2 is a software configuration diagram of the information processing device (before start-up of an operating system (OS) is completed).

FIG. 2 is diagram showing a software configuration at a time of start-up of information processing device 10 (at a time of start-up of the BIOS). At the time of start-up of information processing device 10, when a driver for the OS is not yet read from HDD 13, as shown in FIG. 2, OS 100 reads data from USB memory 50 and HDD 13 via BIOS 110.

[1-2. Operation]

An operation of information processing device 10 configured as above will be described below. Note that, in the description below, USB memory 50 is connected to information processing device 10.

In HDD 13 of the present exemplary embodiment, data is recorded in an encrypted manner. Therefore, when reading the encrypted data stored in HDD 13, controller 11 decrypts the encrypted data by a predetermined decryption key.

In the present exemplary embodiment, a decryption key for decrypting the encrypted data stored in HDD 13 is divided into two pieces of key information in accordance with a predetermined rule; and "key A" as first key information is stored in advance in USB memory 50, and "key B" as second key information is stored in advance in the BIOS (see FIG. 1).

At the time of start-up of information processing device 10, controller 11 acquires key A from USB memory 50 and generates a decryption key from that key A and key B stored in the BIOS, and controller 11 stores the decryption key. When reading encrypted data from HDD 13, controller 11 decrypts the encrypted data by using the decryption key.

Information processing device 10 and USB memory 50 storing part of the key information (key A) constitute an information processing system.

Figure 3:
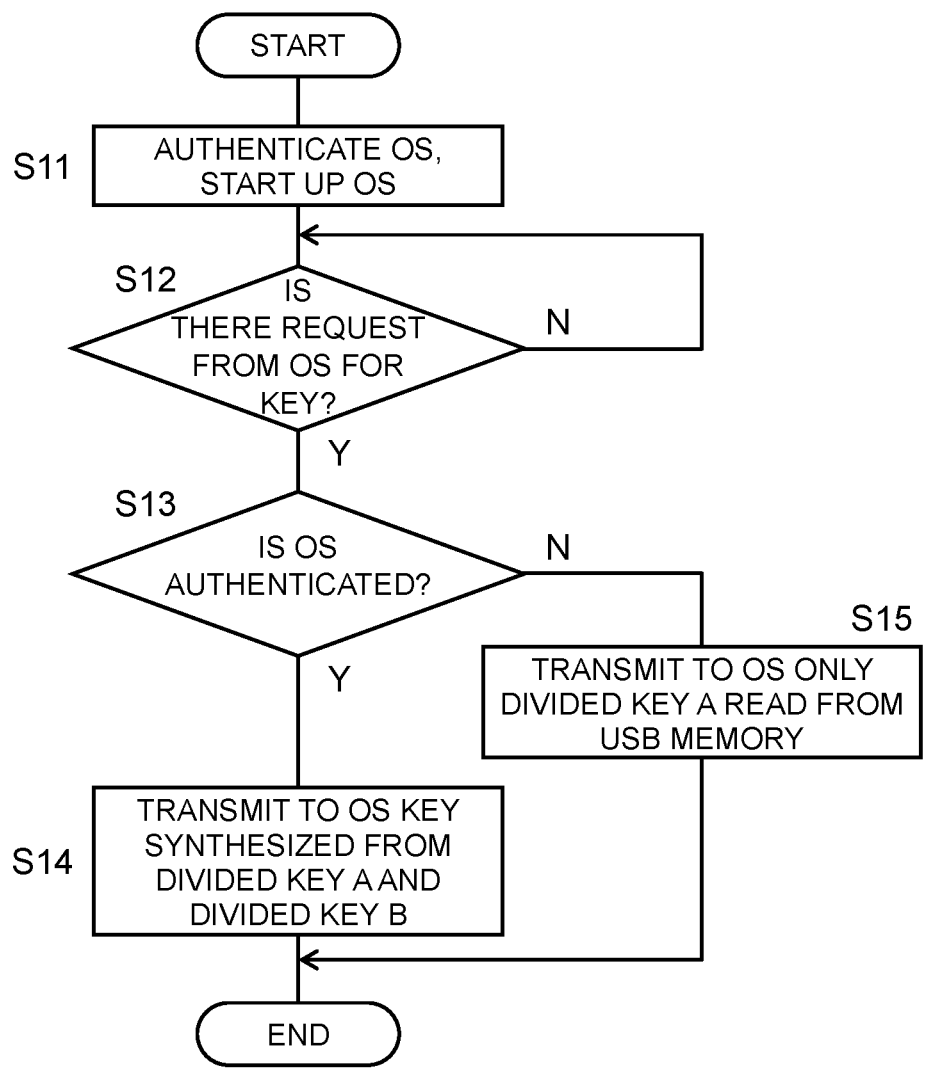
FIG. 3 is a flowchart illustrating acquisition processing of a decryption key to be executed at a time of start-up of the information processing device.

FIG. 3 is a flowchart about acquisition processing of a decryption key to be performed at the time of start-up of information processing device 10. Hereinafter, with respect to FIG. 3, a description will be given on the acquisition processing of a decryption key at the time of start-up of information processing device 10. Note that a function of BIOS 110 to be described below is realized by controller 11 executing BIOS 110 (firmware).

When a power of information processing device 10 is turned on, BIOS 110 is first starts up. BIOS 110 performs authentication of OS 100 and starts up OS 100 (step S11). OS 100 is authenticated by determining whether a certified signature authenticated by BIOS 110 is written in OS 100. Then, if BIOS 110 receives from OS 100 a request for a decryption key for decrypting the data in HDD 13 (step S12), BIOS 110 transmits to OS 100 the decryption key corresponding to the result of the authentication of the OS (steps S14, S15).

Specifically, if OS 100 is an authenticated certified OS (step S13: YES), BIOS 110 reads key A from USB memory 50 and generates a decryption key for decrypting the data in HDD 13 from that key A and key B held by the information processing device; then, BIOS 110 passes the decryption key to OS 100 (step S14). After the decryption key passed to OS 100 is stored in RAM 15, the decryption key is read from RAM 15 and used when HDD 13 is accessed. The decryption key stored in RAM 15 is available only when the power of information processing device 10 is on, and is deleted when the power of information processing device 10 is turned off.

On the other hand, if OS 100 is not an authenticated certified OS (step S13: NO), BIOS 110 passes to OS 100 only key A read from USB memory 50 (step S15). In this case, OS 100 cannot decrypt the data in HDD 13 by using key A. When the OS is not certified as described above, the data in HDD 13 can be prevented from being decrypted, and security is thus ensured.

As described above, in information processing device 10 of the present exemplary embodiment, at the time of start-up, BIOS 110 generates the decryption key for decrypting the data stored in HDD 13 by synthesizing key A stored in USB memory 50 (external recording medium) and key B stored in BIOS 110.

Figure 4:
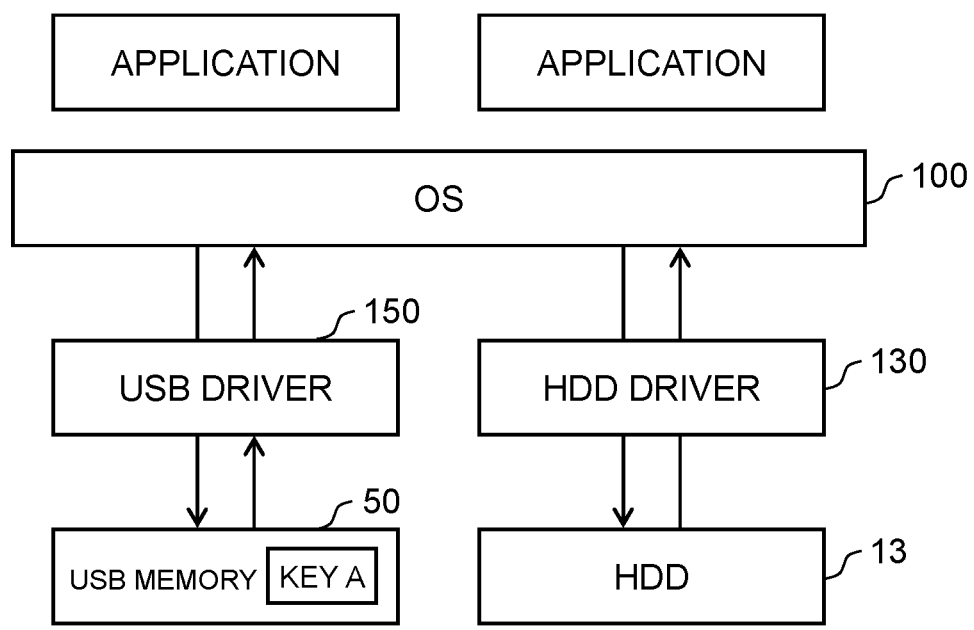
FIG. 4 is a software configuration diagram of the information processing device (after loading of drivers for the OS is completed).

After that, upon receiving the decryption key from BIOS 110, OS 100 sequentially reads from HDD 13 data necessary for start-up processing of information processing device 10 while decrypting the data, using the decryption key. For example, OS 100 reads from HDD 13 drivers, for the OS, corresponding to USB memory 50 and HDD 13. After reading of drivers 130, 150 is completed, OS 100 writes and reads data to and from HDD 13 and USB memory 50 not via BIOS 110 but via drivers 130, 150 as shown in FIG. 4. Therefore, after the start-up of information processing device 10 is completed, key B included in the BIOS is concealed, and key B cannot be accessed. That is, it is difficult to acquire key information for generating a decryption key. Therefore, the possibility of unauthorized acquisition of key B is reduced, and the possibility of unauthorized reading of data can thus be reduced.

[1-3. Effect and Other Benefits]

As described above, information processing device 10 of the present exemplary embodiment includes: USB interface unit 17 (an example of a medium connection unit) that reads first key information (key A) from detachable USB memory 50 (an example of a first recording medium); ROM 14 (an example of a second recording medium) storing a BIOS (an example of firmware) that is a program to be executed at a time of start-up of information processing device 10 and contains second key information (key B); HDD 13 (an example of a third recording medium) storing encrypted data; and controller 11 (an example of a control unit that reads encrypted data from HDD 13 and decrypts the encrypted data. At the time of start-up of the information processing device, controller 11 operates in accordance with the BIOS to generate a decryption key for decrypting the encrypted data, from the first key information (key A) and the second key information (key B).

By this configuration, the decryption key is generated by using key information (key A) stored outside information processing device 10 and key information (key B) stored inside information processing device 10. Therefore, in a case that information processing device 10 gets stolen, if key information (key A) is not stored in USB memory 50, data in information processing device 10 cannot be decrypted, and unauthorized access to the data can be prevented.

Further, in information processing device 10, part of key information (key B) to be used to generate the decryption key is stored in the BIOS.

Controller 11 operates in accordance with the BIOS at the time of start-up of information processing device 10 and generates a decryption key to be used to encrypt encrypted data, from the first key information (key A) stored in USB memory 50 and the key information (key B) included in the BIOS. As described above, the BIOS reads the first key information (key A) and the second key information (key B). After start-up of information processing device 10 is completed, since controller 11 accesses the devices without using the BIOS, it is impossible to acquire the key information (key A, key B) necessary to generate a decryption key. Thus, the possibility of unauthorized reading of data can be reduced.

As described above, in information processing device 10 of the present exemplary embodiment, part of key information to be used to generate a decryption key is not stored simply in a decryption device as in the invention of PTL 1, but stored in firmware (BIOS); therefore, the key information can be read only by a program such as an authenticated certified OS. As a result, in information processing device 10 of the present exemplary embodiment, secrecy of the key information is increased compared with the invention of PTL 1, and the possibility of unauthorized reading of data can be further reduced.

In addition, since the OS receives the generated decryption key from the BIOS, it is not necessary to alter the OS to correspond to the two pieces of divided key information (key A, key B) when the method for generating a decryption key of the present disclosure is employed.

Other Exemplary Embodiments

The first exemplary embodiment is described above as an example of the technique to be disclosed in the present application. However, the technique of the present disclosure can be applied not only to the above exemplary embodiment but also to exemplary embodiments in which modification, replacement, addition, or removal is appropriately made. In addition, a new embodiment can also be made by combining the components described in the above first exemplary embodiment with other components. Thus, other embodiments will be described below as examples.

In first exemplary embodiment, an HDD is used as the recording medium that is inside information processing device 10 and stores part of the key information for generating a decryption key, but the internal recording medium is not limited to an HDD. Instead of an HDD, a solid state drive (SSD) or an embedded multimedia card (eMMC) may be used. Further, the internal recording medium may be detachable from information processing device 10.

Further, a USB memory is used as the external recording medium for storing part of the key information for generating a decryption key, but the external recording medium is not limited to a USB memory. For example, a secure digital (SD) card may be used, or other memory cards may be used. That is, any recording medium detachable from information processing device 10 can be used.

In the above exemplary embodiment, the decryption key is divided into two pieces of key information; however, the decryption key may be divided into more pieces of key information. In this case, at least one piece of key information has only to be stored in the BIOS.

The methods for acquiring a decryption key as described in the above exemplary embodiment can be applied not only to a personal computer and a server device but also to various information processing devices (in other words, electronic equipment) in which encrypted data is stored and which can be connected to an external recording medium.

As described above, the exemplary embodiments are described as examples of the technique in the present disclosure. For that purpose, the accompanying drawings and the detailed description are provided.

Therefore, in order to exemplify the above technique, the components described in the accompanying drawings and the detailed description not only include the components necessary to solve the problem but also can include components unnecessary to solve the problem. For this reason, it should not be immediately recognized that those unnecessary components are necessary just because those unnecessary components are described in the accompanying drawings and the detailed description.

In addition, because the above exemplary embodiments are for exemplifying the technique in the present disclosure, various modifications, replacements, additions, removals, or the like can be made without departing from the scope of the accompanying claims or the equivalent thereof.

INDUSTRIAL APPLICABILITY

Since the present disclosure can reduce the possibility of unauthorized reading of encrypted data, the present disclosure is useful for various information processing devices (for example, a personal computer and a server device) in which encrypted data is stored and which can be connected to an external recording medium.

REFERENCE MARKS IN THE DRAWINGS

10 information processing device
11 controller
13 HDD
14 ROM
15 RAM
16 operation unit
17 USB interface unit
50 USB memory
100 OS
110 BIOS

The invention claimed is:

1. An information processing device comprising:
an interface circuit that reads a first key from a first non-transitory recording medium that is detachable from the information processing device;
a second non-transitory recording medium storing firmware, the firmware being a program to be executed at a time of start-up of the information processing device, the firmware storing a second key;
a third non-transitory recording medium storing encrypted data; and
a controller that reads the encrypted data from the third non-transitory recording medium and decrypts the encrypted data,
wherein at the time of start-up of the information processing device, the controller operates in accordance with the firmware to generate a decryption key for decrypting the encrypted data stored on the third non-transitory recording medium, the decryption key being generated from (i) the first key read from the first non-transitory recording medium that is detachable from the information processing device and (ii) the second key stored in the firmware executed at this time of start-up of the information processing device.

2. The information processing device according to claim 1, wherein in a case that the controller receives a request for a key from an operating system (OS) at the time of start-up of the information processing device, when the OS is an authenticated OS, the controller passes the decryption key to the OS, and when the OS is not an authenticated OS, the controller passes only the first key to the OS.

3. The information processing device according to claim 1, wherein the firmware is a basic input/output system (BIOS).

4. The information processing device according to claim 1, wherein the first non-transitory recording medium is a universal serial bus (USB) memory or a secure digital (SD) card.

5. The information processing device according to claim 1, wherein the third non-transitory recording medium is a hard disk drive (HDD), a solid state drive (SSD), or an embedded multimedia card (eMMC).

6. An information processing system comprising:
    an information processing device; and
    a first non-transitory recording medium that stores a first key and is detachable from the information processing device,
wherein the information processing device includes:
    an interface circuit that reads the first key from the first non-transitory recording medium;
    a second non-transitory recording medium storing firmware, the firmware being a program to be executed at a time of start-up of the information processing device, the firmware storing a second key;
    a third non-transitory recording medium storing encrypted data; and
a controller that reads the encrypted data from the third non-transitory recording medium and decrypts the encrypted data,
wherein at the time of start-up of the information processing device, the controller operates in accordance with the firmware to generate a decryption key for decrypting the encrypted data stored on the third non-transitory recording medium, the decryption key being generated from (i) the first key read from the first non-transitory recording medium that is detachable from the information processing device and (ii) the second key stored in the firmware executed at this time of start-up of the information processing device.

* * * * *